(12) United States Patent
Boecking

(10) Patent No.: US 6,622,985 B2
(45) Date of Patent: Sep. 23, 2003

(54) INJECTION DEVICE, CONTROL VALVE AND METHOD FOR INJECTING FLUID

(75) Inventor: Friedrich Boecking, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 49 days.

(21) Appl. No.: 09/959,143

(22) PCT Filed: Feb. 16, 2001

(86) PCT No.: PCT/DE01/00590

§ 371 (c)(1),
(2), (4) Date: Jan. 24, 2002

(87) PCT Pub. No.: WO01/61181

PCT Pub. Date: Aug. 23, 2001

(65) Prior Publication Data

US 2002/0158219 A1 Oct. 31, 2002

(30) Foreign Application Priority Data

Feb. 18, 2000 (DE) .......................................... 100 06 785

(51) Int. Cl.$^7$ ............................................. F02M 47/02
(52) U.S. Cl. ..................................... 251/129.06; 251/57
(58) Field of Search ................... 251/57, 129.01–129.14

(56) References Cited

U.S. PATENT DOCUMENTS

| | | | | |
|---|---|---|---|---|
| 3,709,564 A | * | 1/1973 | Jeffrey et al. ................... 303/16 |
| 3,893,696 A | * | 7/1975 | Urban et al. ............... 303/118.1 |
| 4,429,708 A | * | 2/1984 | Strueh ..................... 251/129.08 |
| 4,762,300 A | | 8/1988 | Inagaki et al. |
| 5,179,970 A | * | 1/1993 | Jarocki et al. ......... 251/129.08 |
| 5,875,764 A | | 3/1999 | Kappel et al. |
| 6,089,529 A | * | 7/2000 | Boecking ................ 251/129.06 |

* cited by examiner

Primary Examiner—Paul J. Hirsch
(74) Attorney, Agent, or Firm—Michael J. Striker

(57) ABSTRACT

The invention concerns an injection device having a fluid port (10), a control valve (12), a setting element (14), by way of which a region of a first face (24) of the control valve (12) can be acted upon with force, and a control chamber (30) provided on the side of a second face (26) of the control valve (12), whereby a compensating chamber (28) is provided on the side of the first face (24) of the control valve (12), the compensating chamber (28) is partially limited by the first face (24) of the control valve (12), and the compensating chamber (28) communicates with the control chamber (30). The invention also concerns a control valve as well as a method for injecting fluid.

25 Claims, 1 Drawing Sheet

INJECTION DEVICE, CONTROL VALVE AND METHOD FOR INJECTING FLUID

RELATED ART

Figure 1:
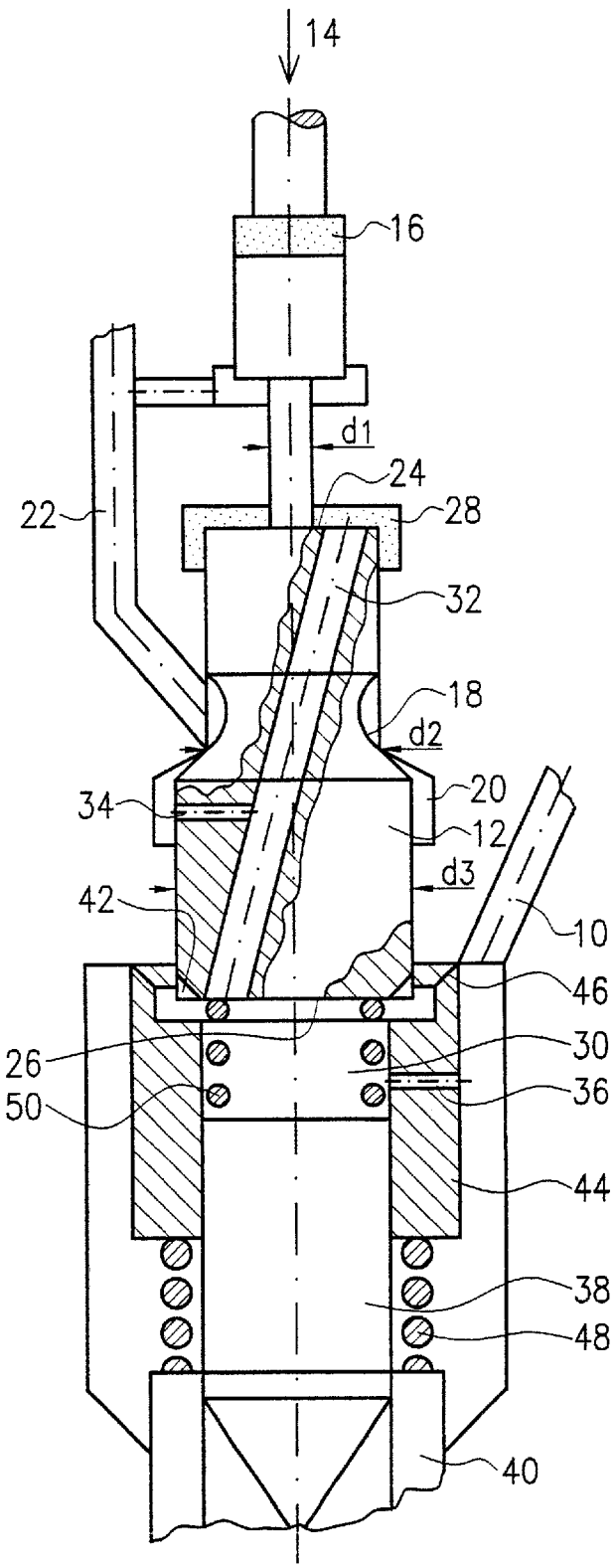

The invention concerns an injection device having a fluid port, a control valve, a setting element, by way of which a region of a first face of the control valve can be acted upon with force, and a control chamber provided on the side of a second face of the control valve. The invention further concerns a control valve having a valve seat, a first face that faces a compensating chamber, and a second face that faces a control chamber. The invention further concerns a method for injecting fluid, in which a first face of a control valve is acted upon with force by way of the extension of a setting element, a control chamber is discharged by way of a valve seat of the control valve, and an injection nozzle opens.

Devices according to the general class as well as a method according to the general class are known. Solenoid valves or piezoactuators are generally provided as setting elements. While solenoid valves, by themselves, can provide a stroke that is sufficient for control, a power-travel pressure intensification is generally required when piezoactuators are used, which is commonly accomplished hydraulically. The motion of the piezoactuator is transferred to the control valve by way of the hydraulic power-travel pressure intensification, so that the switching state of the control valve changes. As a result, the pressure conditions in a control chamber change, which, finally, opens an injection nozzle.

Injection devices are often constructed in such a way that, in an initial state, a high pressure—in the neighborhood of the pressure of a common-rail system—is present in the control chamber. A characteristic feature of such a common-rail system or storage injection system is the fact that pressure generation and injection are decoupled. The injection pressure is generated independently of the engine speed and rate of injection, and it waits in the "rail" (fuel accumulator) for injection. In current systems, the pressure in the common rail is in the range of between 1000 and 2000 bar, with higher pressures coming into increasing use. To open the injection nozzle, the control chamber is discharged via activation of the control valve, so that a reduced pressure acts upon the valve control piston. As a result, the injection nozzle can open. To close the injection nozzle, the control valve is returned to its initial state, whereby high pressure forms in the control chamber once more. As a result, the injection nozzle closes due to the force that acts on the valve control piston.

Depending on the arrangement of the control valve within the injection device, the speed at which the injection nozzle closes may be slower than desired, and the construction of the injection device may be less than compact. Moreover, considerable forces may be required to actuate the control valve by means of the setting element.

Advantages of the Invention

The invention is based on the injection device according to the general class in that a compensating chamber is provided on the side of the first face of the control valve, that the compensating chamber is partially limited by the first front face of the control valve, and that the compensating chamber communicates with the control chamber. By way of this arrangement, the pressure present in the control chamber—in common-rail systems, this is the rail pressure—is transferred to the compensating chamber. This pressure corresponds to a force that acts on the first face of the control valve. The setting element therefore need only exert a reduced force on the control valve in order to actuate it.

The control valve preferably comprises at least one channel that connects the compensating chamber with the control chamber. The transfer of pressure from the control chamber into the compensating chamber can therefore be carried out by way of a simple action.

In a first state, a valve seat of the control valve preferably seals off the control chamber from a leakage system. High pressure can therefore form in the control chamber, which keeps the injection nozzle in a closed state or moves the injection nozzle into a closed state.

It is an advantage thereby if elastic means are provided that hold the valve seat of the control valve closed. By this means, a defined state of the control valve is ensured when the setting element is retracted.

In a second state, the control valve preferably connects the control chamber with a leakage system. If the control valve is therefore acted upon with force by the setting element and transferred to a second state, the pressure can escape from the control chamber into the leakage system. This makes it possible for the injection nozzle to open.

In a preferred arrangement, the control chamber is connected to the leakage system by way of the channel and a drainage damping valve. As a result of the interplay with the other flow conditions within the system, a drainage damping valve makes it possible to influence the opening time of the injection nozzle. The provision of this drainage damping valve in conjunction with the channel—by way of which the control chamber communicates with the compensating chamber—is particularly economical and space-saving, so that a compact construction of the control valve is encouraged.

The control valve preferably comprises a surface area in the chamber around the valve seat that can be acted upon with force by the pressure generated in the control chamber. By this means, a further force equalization takes place, and the force to be applied by the setting element on the control valve is reduced once more.

It is particularly advantageous thereby if the effective first face of the control valve, together with the effective surface area in the space around the region of the valve seat, basically corresponds to the effective second face. In this context, "effective surface area" refers, in each case, to a surface area that is perpendicular to the direction of movement of the control valve. If the effective second face is acted upon with force by the total pressure in the control chamber, this force is equalized by the sum of forces that act on the first face, on the one hand, and on the surface area in the chamber around the valve seat, on the other. The effective surface area that is available for the force equalization is therefore only reduced around the surface area of the first face upon which the setting element acts. This surface area has a diameter of 1.8 mm, for example, and is extremely small compared to the effective second face. A satisfying force equalization is therefore achieved.

Further advantages of the invention result from the fact that, in a first state of the control valve, and in a second state of the control valve, the fluid port is sealed off from the control chamber. In these states of the control valve, the control chamber is connected to the fluid port only by way of a port damping valve. This makes it possible for pressure reduction to take place by way of the connection of the control chamber with the leakage system.

It is then particularly advantageous if, in a third state of the control valve, a connection is established between the fluid port and the control chamber. When the control valve enters the third switching state, therefore, it becomes possible for the pressure in the control chamber to increase abruptly, which causes the injection nozzle to close particularly rapidly.

The control chamber and the fluid port are preferably sealed off and connected, respectively, by means of a control sleeve that can be moved by the control valve. During the first and second switching states, the control sleeve is located in its control sleeve seat, by way of which the fluid port is sealed off from the control chamber. If the control valve moves into its third switching state, however, the control sleeve is lifted out of its control sleeve seat, and the fluid port and control chamber are suddenly connected. This results in the abrupt increase of pressure in the control chamber, which makes the advantageously rapid closing of the injection nozzle possible.

The setting element is preferably a piezocontroller. Piezocontrollers have proven to be effective in injection devices due to their compact construction and reliability. Moreover, the implementation of multiple switching states of the control valve is made possible by varying the electrical control variables of the piezoconnector in reliable fashion.

It is advantageous to provide a hydraulic power-travel pressure intensifier, by way of which the setting element acts upon the control valve with force. As a result, the various switching states of the control valve can be achieved even when the travel of the piezocontroller or piezoactuator is minimal.

The fluid port is preferably connected to a common-rail system. Since the common rail always provides high pressure regardless of the injection process, the injection nozzle can be closed particularly rapidly.

The control chamber is preferably connected to the fluid port by way of a port damping valve. The opening speed of the injection nozzle can therefore be influenced by way of a suitable design of the port damping valve with regard for other flow conditions, in particular by a drainage damping valve.

It is advantageous when the control valve projects into the control chamber. This makes a particularly compact design of the injection device possible.

The invention also concerns a control valve that is based on the control valve according to the general class in that a chamber around the valve seat, the compensating chamber, and the control chamber communicate with each other. By this means, the control valve is force-equalized, so that only minimal forces need by applied by the setting element to actuate the control valve.

The control chamber and the compensating chamber preferably communicate by way of a channel provided in the control valve. This is a particularly simple solution for providing the force equalization according to the invention.

It is particularly advantageous when the chamber around the valve seat is connected with the channel by way of a damping valve. The control valve must therefore be inserted in such a fashion that a control chamber communicates with the chamber around the valve seat by way of the channel and a damping valve. This solution is particularly economical. On the other hand, a damping valve makes it possible to utilize the flow conditions in the control valve for other control purposes.

The effective first face, together with the effective surface area in the chamber around the valve seat, preferably corresponds basically to the effective second face. In this context, "effective surface area" refers to the surface component arranged perpendicularly to the direction of movement of the control valve. An extensive force equalization therefore takes place.

The invention is based on the method according to the general class in that at least one part of the first face of the control valve is acted upon with force by the pressure of a fluid, so that the force acting on the second face of the control valve is at least partially equalized. It is therefore not necessary to apply the entire force acting on the second face of the control valve using the setting element.

The force acting on the second face is preferably equalized as well by the fact that a surface area in the region of the valve seat is acted on with force by the pressure of a fluid. As a result of this additional force equalization, the force to be applied by the setting element can be reduced once more.

The method according to the invention is preferably further developed in that the setting element is extended further after the control chamber is discharged, that, as a result of the further extension of the setting element by the control valve, a control sleeve is lifted out of its control sleeve seat and moved, that the moving of the control sleeve causes pressure to be applied to the control chamber, and that the pressure in the control chamber causes the injection nozzle to close. The injection nozzle is therefore not closed by the retraction of the setting element, but rather by a further extension. The pressure in the control chamber must not increase by way of the port damping valve; given the speed at which the pressure increases, this can have negative consequences. Rather, it can increase suddenly by way of the control sleeve seat via the connection with the fluid port. This causes the injection nozzle to close particularly rapidly.

After the injection nozzle closes, the setting element is preferably retracted, and the control sleeve and the control valve return to the control sleeve seat or the valve seat, respectively. This returning of the control sleeve and the control valve therefore takes place independently of the actual injection process, which leads to an advantageous decoupling of the various processes within the valve.

It is preferable if the control chamber is not discharged while the control sleeve and the control valve are returning to the control sleeve seat and the valve seat, respectively, as this could cause the injection nozzle to open. This can be achieved either by way of the ratios of the forces acting on the moveable elements and, therefore, by way of the order in which the elements return to their seats, or it can be achieved by way of switching processes that are rapid in comparison to the flow processes.

The invention is based on the surprising finding that a force-equalized control valve offers numerous advantages. On the one hand, for example, the force to be applied by the setting element is reduced and, on the other hand, a compact construction of the injection device is made possible by the fact that the control valve projects into the control chamber. A further advantage is the fact that a particularly rapid closing of the injection nozzle can be made possible. All of these advantages are realized in particular when it is used in a common-rail system.

DIAGRAM

The invention will now be described with reference to the accompanying diagram using a preferred embodiment as an example.

FIG. 1 is a schematic, partially exposed representation of an injection device according to the invention.

DESCRIPTION OF THE EMBODIMENT

FIG. 1 shows an injection device according to the invention. The injection device is supplied with the fluid to be injected—preferably with diesel fuel—by way of a fluid port 10. A control valve 12 is controlled by a setting element 14, preferably a piezoactuator, by way of a hydraulic pressure intensifier 16. The control valve 12 comprises a valve seat 18. In the state shown, the valve seat separates a chamber 20 from a leakage system 22. The control valve 12 also comprises a first face 24 and a second face 26. The first face 24 partially limits a compensating chamber 28. The second face 26 projects into a control chamber 30. The compensating chamber 24 is connected to the control chamber 30 by way of a channel 32. A drainage damping valve 34 joins the channel 32, which connects the channel 32 and, therefore, the compensating chamber 28 and the control chamber 30 with the chamber 20 around the valve seat 18.

In the state shown, the control chamber 30 is filled with the pressure provided via the fluid port 10 and a port damping valve 36. It is preferably made available by a common rail. This pressure acts upon the valve control piston 38 with force, so that the injection nozzle 40 is closed.

When the setting element 14 is actuated, the control valve 12 is actuated by way of the hydraulic pressure intensifier 16. As a result, the control valve 12 establishes a connection between the chamber 20 around the valve seat 18 and the leakage system 22. The pressure in the control chamber 30 can thereby be reduced via the channel 32 and the drainage damping valve 34. The valve control piston 38 is relieved, and travel-controlled opening of the injection nozzle 40 takes place.

Since the compensating chamber 28, the chamber 20 around the valve seat 18, and the control chamber 30 communicate by way of the channel 32 and the drainage damping valve 34, force equalization takes place. Due to the pressure of the fluid, a force acts on the face 24 of the control valve in the compensating chamber 28, reduced by a surface area that corresponds to the diameter $d_1$ indicated in the diagram. In the chamber 20 around the valve seat 18, the fluid pressure also causes a force to act on a surface area that corresponds to a ring having the outer diameter $d_3$ and the inner diameter $d_2$. As a result of the fluid pressure, a force that corresponds to the diameter $d_3$ indicated in the diagram acts on the second face 26 of the control valve 12. As a result, the forces—except for the force corresponding to the diameter $d_1$—acting on the effective surface areas of the control valve 12 are equalized. This is the only force to be applied by the hydraulic pressure-intensified setting element 14 via the fluid against the force acting on the second face 26 in the control chamber 30.

To close the injection nozzle 40, the setting element 14 is not retracted immediately. Rather, it is extended further, so that the control valve 12 impacts a control sleeve 44 in the region of a groove 42 running on its second face 26. At this time, this is still located in its seat 46, by way of which it seals off the fluid port 10 from the control chamber 30. If the control sleeve 44 is lifted out of its seat 46, however, the control chamber 30 is suddenly filled with the common-rail pressure introduced via the fluid port 10, and the injection nozzle 40 therefore closes abruptly.

As a result, the setting element 14 is retracted, and the control sleeve 44 and the control valve 12 are pushed back by springs 48, 50 into the control sleeve seat 46 and the valve seat 18, respectively. By arranging the spring forces in suitable fashion in relation to the other system parameters, it is possible to maintain the pressure in the control chamber 30 to the extent that the valve control piston 38 is not relieved, which would cause the injection nozzle 40 to open.

While the injection nozzle 40 is closed abruptly by the movement of the control sleeve 44, the opening behavior of the injection nozzle 40 can be influenced by a suitable selection of the drainage damping valve 34 and/or the port damping valve 36.

The preceding description of the embodiments according to the present invention are intended to serve as illustrations only and are not intended to limit the invention. Various changes and modifications within the framework of the invention are possible without leaving the scope of the invention or its equivalents.

What is claimed is:

1. Injection device having a fluid port (10), a control valve (12), a setting element (14), by way of which a region of a first face (24) of the control valve (12) can be acted upon with force, and a control chamber (30) provided on the side of a second face (26) of the control valve (12), characterized in that a compensating chamber (28) is provided on the side of the first face (24) of the control valve (12), that the compensating chamber (28) is partially limited by the first face (24) of the control valve (12), and that the compensating chamber (28) communicates with the control chamber (30).

2. Injection device according to claim 1, characterized in that the control valve (12) comprises at least one channel (32) that connects the compensating chamber (28) with the control chamber (30).

3. Injection device according to claim 1, characterized in that, in a first state, a valve seat (18) of the control valve (12) seals off the control chamber (30) from a leakage system (22).

4. Injection device according to claim 3, characterized in that elastic means (50) are provided that hold the valve seat (18) of the control valve (12) closed.

5. Injection device according to claim 2, characterized in that, in a second state, the control valve (12) connects the control chamber (30) with a leakage system (22).

6. Injection device according to claim 5, characterized in that the control chamber (30) is connected with the leakage system (22) by way of the channel (32) and a drainage damping valve (34).

7. Injection device according to claim 3, characterized in that the control valve (12) comprises a surface area in a chamber (20) around the valve seat (18) that can be acted upon with force by the pressure generated in the control chamber (30).

8. Injection device according to claim 7, characterized in that the effective first face (24) of the control valve (12), together with the effective surface area in the chamber (20) around the valve seat (18) basically corresponds to the effective second face (26) of the control valve (12).

9. Injection device according to claim 1, characterized in that, in a first state of the control valve (12) and in a second state of the control valve (12), the fluid port (10) is sealed off from the control chamber (30).

10. Injection device according to claim 1, characterized in that, in a third state of the control valve (12), a connection is established between the fluid port (10) and the control chamber (30).

11. Injection device according to claim 9, characterized in that the sealing off and connecting of the control chamber (12) and the fluid port (10) are carried out by means of the control sleeve (44) that can be moved by the control valve (12).

12. Injection device according to claim 1, characterized in that the setting element (14) is a piezoactuator.

13. Injection device according to claim 1, characterized in that a hydraulic power-travel pressure intensifier (16) is provided, by way of which the setting element (14) acts upon the control valve (12) with force.

14. Injection device according to claim 1, characterized in that the fluid port (10) is connected with a common rail.

15. Injection device according to claim 1, characterized in that the control chamber (30) is connected with the fluid port (10) by way of a port damping valve (36).

16. Injection device according to claim 1, characterized in that the control valve (12) projects into the control chamber (30).

17. Control valve having a valve seat (18), a first face (24) that faces a compensating chamber (28), and a second face (26) that faces a control chamber (30), characterized in that a chamber (20) around the valve seat (18), the compensating chamber (28), and the control chamber (30) communicate with each other.

18. Control valve according to claim 17, characterized in that the control chamber (30) and the compensating chamber (28) communicate by way of a channel (32) provided in the control valve (12).

19. Control valve according to claim 18, characterized in that the chamber (20) around the valve seat (18) is connected with the channel (32) by way of a damping valve (24).

20. Control valve according to claim 17, characterized in that the effective first face (24), together with the effective surface area in the chamber (20) around the valve seat (18), basically corresponds to the effective second face (26).

21. Method for injecting fluid, in which a first face (24) of a control valve (12) is acted upon with force by the extension of a setting element (14), a control chamber (30) is discharged by way of a valve seat (18) of the control valve (12), and an injection nozzle (40) opens, characterized in that, at least one part of the first face (24) of the control valve (12) is acted upon with force by the pressure of a fluid, so that the force acting on the second face (26) of the control valve (12) is at least partially equalized.

22. Method according to claim 21, characterized in that the force acting on the second face (26) is also equalized by the fact that a surface area in a chamber (20) around the valve seat (18) is acted upon with force by the pressure of a fluid.

23. Method according to claim 21, characterized in that, after the control chamber (30) is discharged, the setting element (14) is extended further, that, by way of the further extension of the setting element (14) from the control valve (12), a control sleeve (44) is lifted out of its control sleeve seat (46) and moved, that, due to the sliding of the control sleeve (44), the control chamber (30) is acted upon with pressure, and that the injection nozzle (40) is closed by way of the pressure in the control chamber (30).

24. Method according to claim 23, characterized in that, after the injection nozzle (40) closes, the setting element (14) is retracted and the control sleeve (44) and the control value (12) return to the control sleeve seat (46) and the value seat (18), respectively.

25. Method according to claim 24, characterized in that, while the control sleeve (44) and the control value (12) are returning to the control sleeve seat (46) and the value seat (18), respectively, the control chamber (30) is not discharged, which could cause the injection nozzle (40) to open.

\* \* \* \* \*